UNITED STATES PATENT OFFICE.

GEORGE F. WHITNEY, OF BOSTON, MASSACHUSETTS, ASSIGNOR TO HIMSELF AND HERBERT S. MERRILL, OF SAME PLACE.

IMPROVED COMPOUND FOR OILING, POLISHING, AND BLACKING LEATHER.

Specification forming part of Letters Patent No. 103,402, dated May 24, 1870.

*To all whom it may concern:*

I, GEORGE F. WHITNEY, of Boston, in the county of Suffolk and State of Massachusetts, have invented a certain new and useful compound, of which the following is a specification:

The nature of my invention consists in compounding a new soap mixture, more especially adapted to harnesses, but applicable to many other purposes, its characteristic being that it will act as an oil, as blacking, and impart a polish to the article to which it is applied.

To prepare this compound I proceed as follows: I mix castile-soap, or its equivalent, with some suitable blacking—lamp-black or bone-black, for instance—with a solution of gum-arabic.

The proportions may be varied; but I have found from experience that the following make a very good composition: Castile-soap, three hundred pounds; lamp-black, six and a half pounds; aqueous solution of gum-arabic, of the thickness of sirup or of dextrine, seven and a half pounds.

The advantage I claim for my composition is that, while it fills and softens the leather, it will at the same time leave it black and glossy and not liable to crack.

I claim as my invention—

The manufacture of a preparation of a saponaceous compound, substantially as described, and for the purpose set forth.

GEORGE F. WHITNEY.

Witnesses:
F. G. PARKER,
JAS. S. CONANT.